Sept. 20, 1927.
P. W. WILCOX
1,643,144
DUSTING MACHINE
Filed March 6, 1923
2 Sheets-Sheet 1
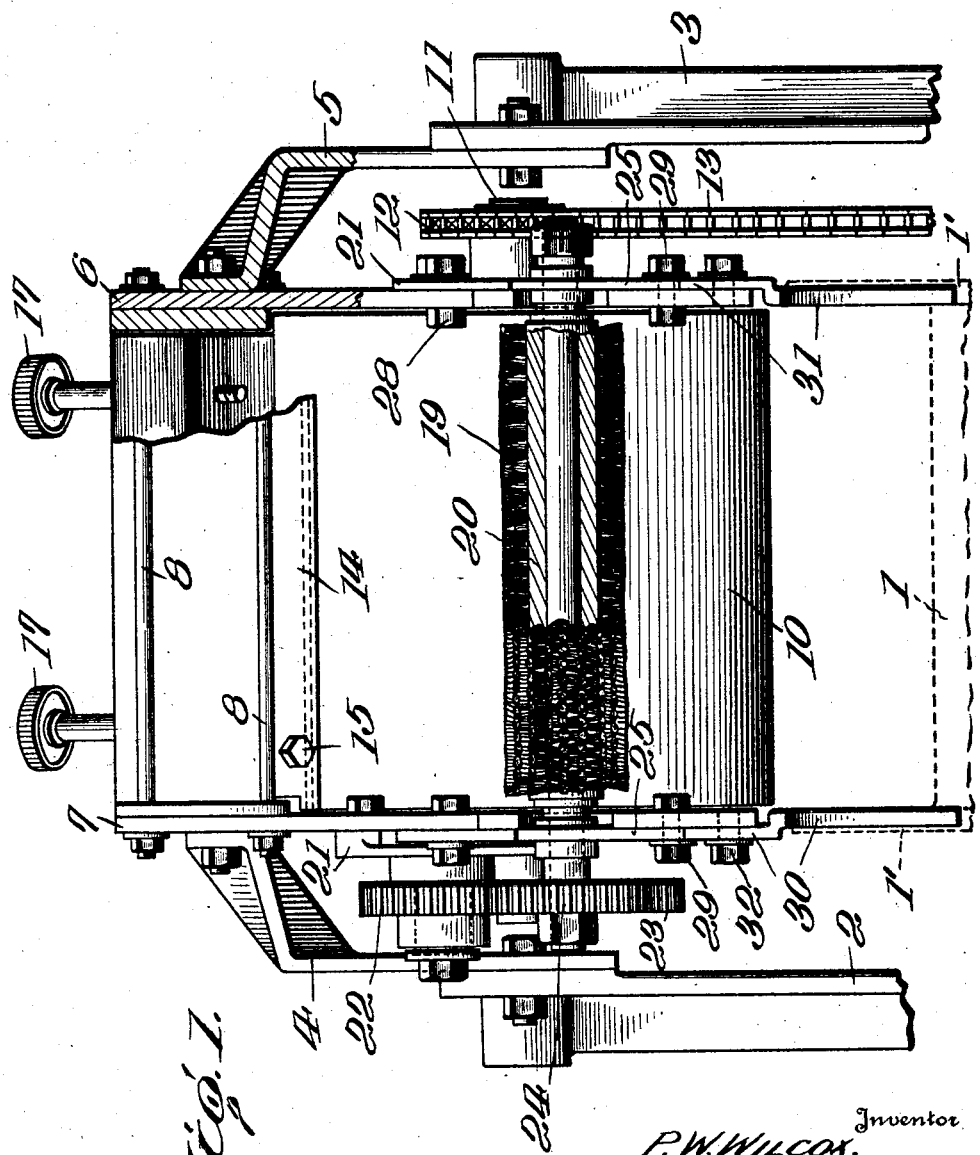

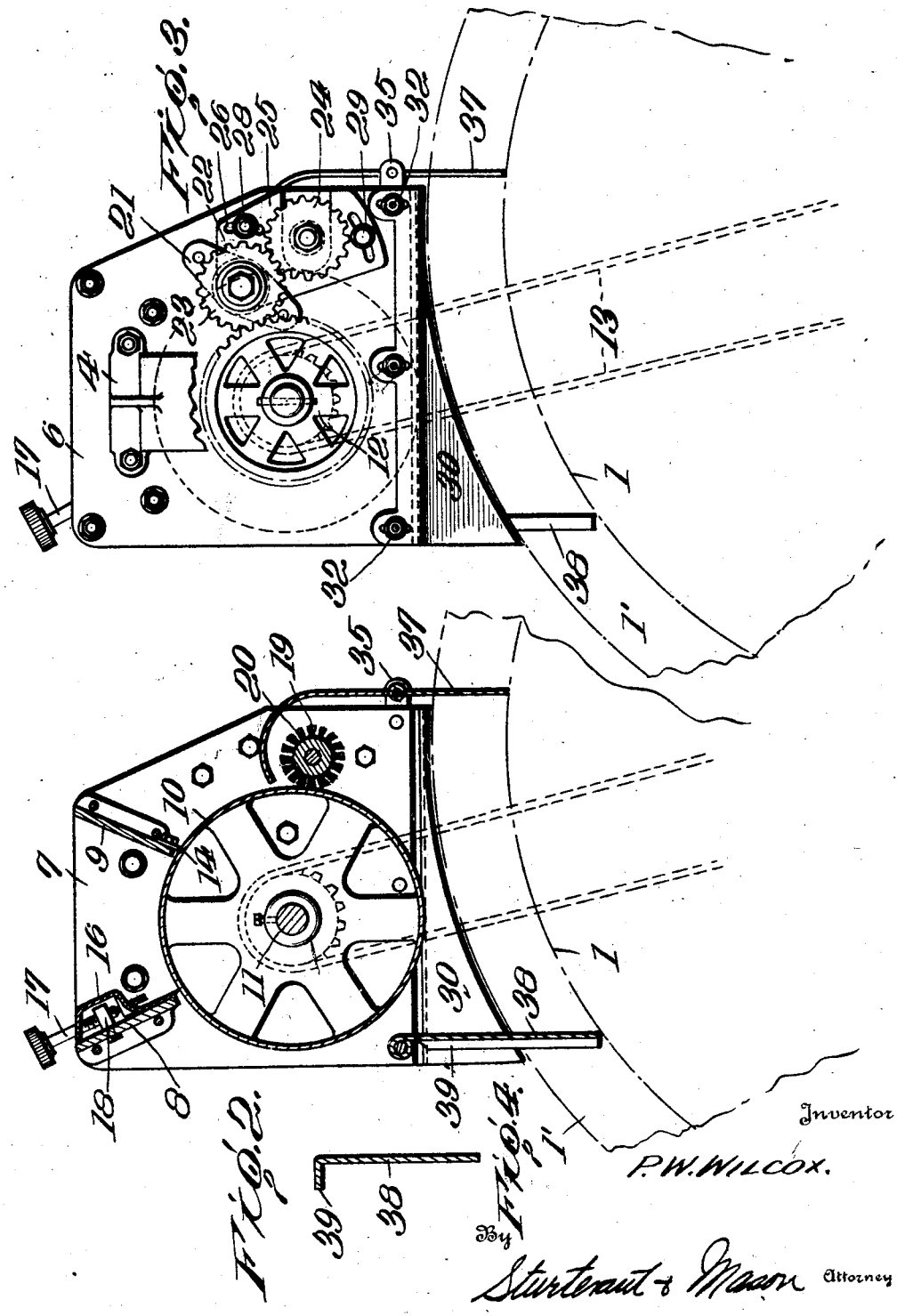

Patented Sept. 20, 1927.

1,643,144

UNITED STATES PATENT OFFICE.

PHILIP W. WILCOX, OF ATLANTA, GEORGIA; KATHARINE RAWLING WILCOX EXECUTRIX OF SAID PHILIP W. WILCOX, DECEASED.

DUSTING MACHINE.

Application filed March 6, 1923. Serial No. 623,253.

This invention relates to apparatus for uniformly applying powdered substances, such as flour, powdered oil and the like to desired surfaces. In particular, this invention is an improved embodiment of the construction presented in my pending application filed concurrently herewith.

An object of the present invention resides in providing a more compact and simple apparatus than that shown in my former application above identified.

Still another object of this invention resides in arranging the brush so that it rotates in contact with the movable feeding means in such a manner as to produce the desired atomization of the powder and thereby eliminating the rigid abutment necessary in my prior construction.

A further object of this invention resides in the provision of a rotating drum in lieu of a traveling endless belt as the means for closing the hopper outlet and conveying the powdered substance to the projecting brush thereby eliminating the sticking of the powder on the under surface of the endless belt of my prior construction.

Still another feature resides in the provision of an adjustable scraper for the rotating drum and also the improved adjustable gate for regulating the discharge from the hopper.

A further feature resides in the simple and compact means for driving the brush from the rotating drum and in the manner of adjusting the brush relative thereto.

These and other objects will be manifest from a perusal of the following specification taken in connection with the accompanying drawings, wherein—

Figure 1 is a side view of the device partly in section;

Fig. 2 is a section through the hopper, and

Fig. 3 is an end elevation of the hopper.

Fig. 4 is a detail in section of the swinging doors.

The invention in the present instance embodies a construction which is capable of general application, that is, which is adapted to atomize and distribute evenly, any powdered substance against all portions of any desired surface to be treated. In order to present one specific embodiment of the invention in a particular form in order that its adaptability and utility in the art may be more clearly demonstrated, I have shown the structure in the form of an attachment for the rotatable drum of a baker's molding machine. It is of course, obvious that the structure is likewise adapted in the baking art to any other kind of bakers' machine, or to bread pans, or in fact, any dough receiving surface. The powdered substances may include flour, powdered, dehydrogenated oil, or any other desirable substitute.

Referring now particularly to the accompanying drawing, the usual rotating drum 1 of a baker's molding machine is provided on its sides with two upstanding supports 2 and 3, to which are bolted upright brackets 4 and 5. These brackets in turn have bolted to them a box-like structure consisting of side plates 6 and 7 suitably bolted together by a plurality of cross bolts such as 8'. The upper portion of the space between these plates 6 and 7 is provided with two transverse partitions 8 and 9 which are preferably inclined inwardly from top to bottom to form a hopper adapted to receive powdered substances, such as flour, powdered, dehydrogenated oil and the like. In my former construction, the outlet of this hopper was closed by a traveling belt which in addition functioned to feed the contents of the hopper to the atomizing means. This construction was objectionable because the floating particles of oil or flour lodged on the under sides of the belt and caused defective operation. In the present construction, the bottom of this hopper which is otherwise normally open and free, is substantially closed by means of a drum or wheel 10 arranged so that its periphery extends across the entire discharge outlet of the hopper. This drum 10 is mounted on a shaft 11 journaled in the two side plates 6 and 7 and provided on one end with a gear 12 driven by a chain 13 from any suitable source of power, such for instance, as from the molding machine itself, or from some like shaft, or even by hand. The partition 9 above referred to is slightly spaced from the periphery of the drum 10. This space is taken up by means of a scraper 14 adjustably held in desired scraping contact with the periphery of this drum by means of suitable bolts or adjusting screws 15. The partition 8 is likewise spaced from the periphery of the drum and the gap therebetween is provided with a gate 16 extending entirely across the side of the hopper.

This gate is adjustable to and from the periphery of the drum by means of an adjusting screw 17 passing through the threaded lug 18 on the partition 8. By the turning of the screw 17 the gate will approach or recede from the periphery of the drum to vary the quantity of powdered substance fed from the hopper by means of the drum 10.

In order to atomize or project the powdered substance in the form of a fog or mist against the surface to be treated, in the present instance, the rotating drum 1 of the molding machine, a driven brush 19 is utilized. In my prior application, the bristles of this brush rotate against the rigid part, and the dragging motion of the bristles against the rigid part is utilized to flick the dust upon the bristles as must be evident, whereas, in this application, the brush is disposed so that the bristles rotate in contact with the feed drum 10 and in such position that the powder carried around by the drum to the bristles is projected in the desired direction against the face of the molding drum 1. In order to drive this brush, the side plate 6 is provided with a bracket 21 in which is mounted an idle gear 22 which meshes with a gear 23 on the end of shaft 11 opposite to that to which gear 12 is fixed. Idle gear 22 in turn meshes with a brush gear 24 mounted on the end of the brush shaft 20. The brush shaft 20 in turn is carried by two plates 25, each pivotally mounted on plates 6 and 7 to swing about the cam axis of the idle gear 22. This construction is shown clearly in Fig. 3. In order to permit this construction, the plates 6 and 7 are cut away surrounding the brush shaft 20. The plates 25 are held in any adjusted position by means of the slots 26 and 27 and bolts 28 and 29. By this construction as the bristles of the brush wear down, the brush shaft 20 may be adjusted closer to the rotating drum 10 while preserving the intermeshing of the gears 23, 22 and 24. If desired, the plates 6 and 7 may be provided with depending flanges 30 and 31 which are disposed at the sides of the flange of the molding machine drum 1. Suitable adjustment is being provided by a slot and bolt connection 32.

In the operation of the device, the hopper is filled with powdered substance and the machine put in operation. The drum 10 rotates in the direction of the arrow (Fig. 2) and the brush 19 rotates in contact with this drum in the direction shown. The screws 17 are adjusted to provide the feed of powdered substance desired, so that as the drum rotates, the powder will pass out of the hopper beneath the gate 16 and will be carried around by the drum 10. The loose powder will fall directly on the drum 1, whereas, the powder adhering to the drum 10 will be carried around in contact with the rotating brush 20, which will act to atomize the powder and distribute it on the rotating drum 1. The powder which is not properly flicked off the drum will be scraped off by means of the scraper 14 so that the surface of the drum is kept in clean condition and will assure the proper efflux of the powder from the hopper. It has been found very practical to enclose the zone of atomization. To this end, the side plates 6 and 7 are provided with ears 35, 36 to which are pivoted dependent swinging doors 37, 38 of trough-shaped cross section as illustrated in Fig. 4, with the flanges 39 facing outwardly. These flanges cause any of the escaping spray of powder to travel close to the lateral drum flange D' and to adhere thereto.

It must be obvious that by suitable rearrangement of construction, this device is equally applicable to any type of machine, whether in the baking art or any other desired art. The device can also be adapted for flicking powder upon bread pans and the like. The device as constructed presents a very simple and most compact arrangement for distributing the powdered substance uniformly and economically upon the surfaces to be treated, and is at the same time dust-proof and sanitary.

It is obvious that minor changes in the details of construction and the arrangement of the parts may be made without departing from the spirit of the invention as set forth in the appended claim.

Having thus described the invention, what I claim as new and desire to secure by Letters Patent, is—

In a device of the class described, the combination of a support, a hopper thereon having a discharge outlet, a rotatable cylinder journaled on said hopper with its periphery lying across the mouth of said hopper outlet, a gear on said drum shaft, an idle shaft and a gear thereon meshing with said first-mentioned gear, a bracket pivotally mounted on said idle shaft, a brush shaft on said bracket, a brush on said brush shaft adapted to contact with the periphery of the drum, a gear on said brush shaft meshing with said idle gear, and means whereby said bracket may be adjusted angularly on its pivot to adjust the brush relatively to the drum.

In testimony whereof, I affix my signature.

PHILIP W. WILCOX.